UNITED STATES PATENT OFFICE.

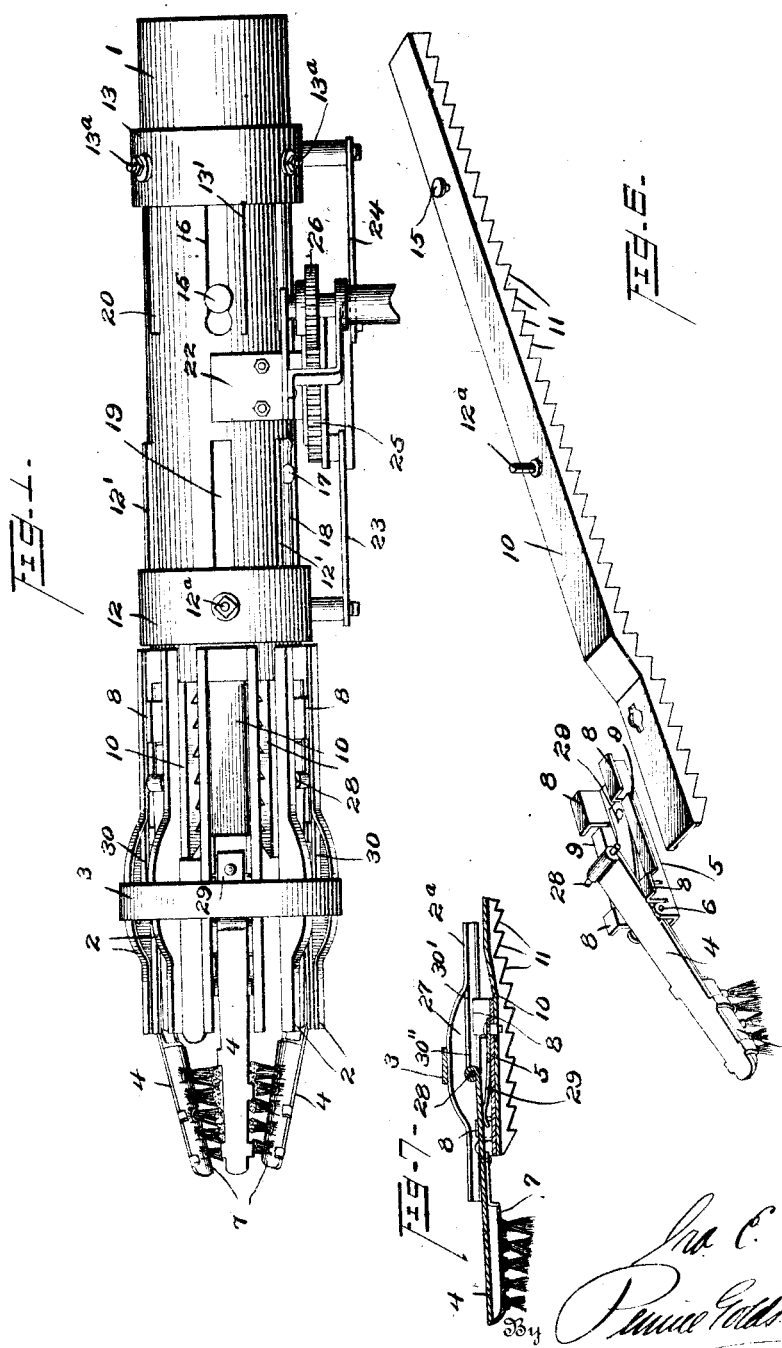

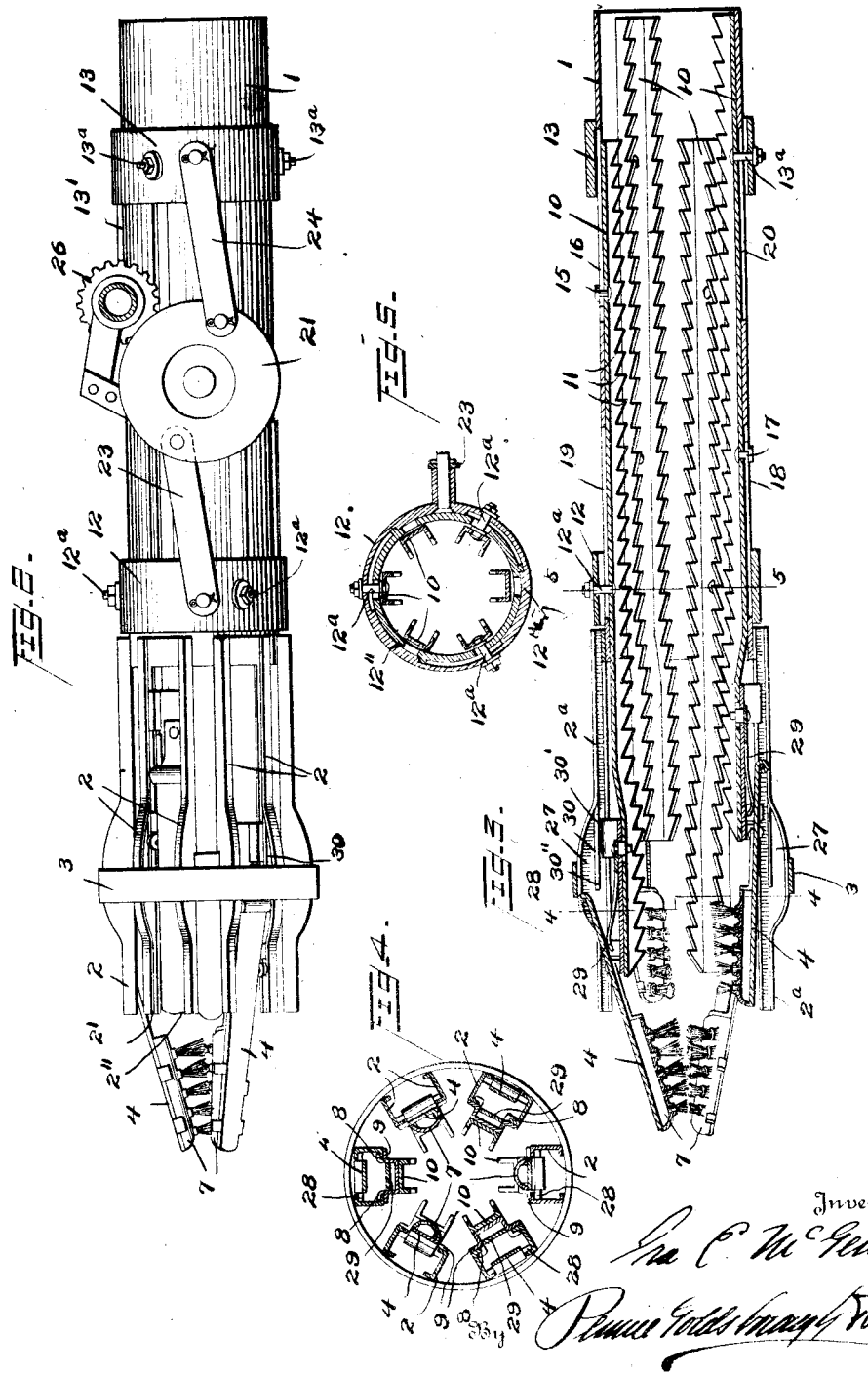

IRA E. McGEHEE, OF CHATHAM, MISSISSIPPI.

COTTON-PICKER HEAD.

1,196,373.

Specification of Letters Patent. Patented Aug. 29, 1916.

Application filed July 11, 1916. Serial No. 108,704.

*To all whom it may concern:*

Be it known that I, IRA E. MCGEHEE, a citizen of the United States, residing in the city of Chatham, county of Washington, and State of Mississippi, have invented certain new and useful Improvements in Cotton-Picker Heads; and I do hereby declare the following to be a full, clear, and exact description of the invention, such as will enable others skilled in the art to which it appertains to make and use the same.

This invention relates to apparatus for picking or harvesting cotton and has for its object to provide an improved picker head having the novel features of construction and operation hereinafter set forth.

The invention is illustrated in the accompanying drawings, in which:—

Figure 1 is a plan view of the improved picker head; Fig. 2 is a side elevation of the construction shown in Fig. 1; Fig. 3 is a central longitudinal section through the picked head; Fig. 4 is a vertical transverse section taken on the line 4—4 of Fig. 3; Fig. 5 is a vertical transverse section taken on the line 5—5 of Fig. 3; Fig. 6 is a detail perspective view of one of the picker fingers and conveying members removed from the picker head, the picker finger and its associated parts being detached from the conveying member to more clearly illustrate the construction of the parts; and Fig. 7 is a longitudinal section taken through one of the picker fingers showing the manner in which it is mounted in one of the guides of the picker head.

In order to make the following detail description of the picker head more comprehensible, it might here be stated that the main parts of the picker head comprise a hollow cylindrical tube having at one end a circularly arranged series of longitudinal guides, in each of which a picker finger is mounted to reciprocate. There are preferably six of these guides and six picker fingers arranged in two groups of three fingers each. Reciprocating motion is so imparted to the two groups of fingers that the two groups reciprocate in opposite directions, that is, while one group of fingers is advancing, the other group is being withdrawn from its advanced position. The guides above referred to are so constructed and the fingers are so associated with the guides that as one group of fingers is advanced, the fingers of that group are retained in an open or spread condition, so that they may readily grip the cotton. The fingers are then made to approach each other and are retracted or moved rearwardly and are then opened or separated and again advanced. This action takes place with each group of fingers, so that as one group of fingers is being moved rearwardly in their contracted or closed position, the fingers of the other group are being advanced in their open or separated position. The necessary reciprocating motion is imparted to the two groups or sets of fingers by any suitable mechanism, such as that hereinafter described. The cotton carried into the tube by the picker fingers is conveyed through the tube by a series of conveying members, one of such conveying members being connected to reciprocate with each of the picker fingers. The cotton discharged from the rear end of the tube may pass into a bag connected with the tube or may be conducted pneumatically, if desired, to any appropriate point of collection. The picker head is preferably hand directed, that is, it is held in the hand of the operator who directs the picker head toward the cotton bolls, and the cotton is then gripped by the fingers and conveyed through the tube, in the manner above described.

The cylindrical tube above referred to is shown at 1. To one end of the tube are secured a plurality of guides 2 which form a skeleton-like structure which is encircled and braced by the circular band 3. Each of these guides comprises two spaced channel-like members, one of which is indicated at 2', and the other at 2''. The open channel parts of these channel members face each other, so that they constitute guides for a transverse pin carried by the picker fingers and also for guiding lugs associated with the picker fingers.

The detailed construction of the picker fingers is shown in Fig. 6, from which it will be noted that each finger comprises an arm 4 pivotally mounted upon a small carriage 5, as shown at 6. The picker fingers may be constructed in any desired manner to properly perform their function of gripping the cotton, but preferably the fingers are made of the brush type, that is, each finger carries at its extremity a small brush 7.

Each carriage 5 is provided with a plurality of horizontally projecting lugs 8 which move in the above-described channels of the guides 2. The carriages are also preferably provided with a pair of similar horizontally projecting lugs or flanges 9 which are positioned at a lower level than the lugs or flanges 8 and serve to engage under the channel members of the guides to steady the carriage and more effectively guide the same. This is clearly shown in Fig. 4.

Each of the carriages 5 is secured to a conveying member 10 (Fig. 6) which is preferably channel-shape in cross section. The side flanges of these members are serrated or toothed, as shown at 11, to provide a plurality of pointed projections for engaging with the cotton to move it rearwardly through the tube 1. These conveying members 10 are positioned on the inside of the tube 1 with the teeth 11 projecting toward the axis of the tube, as clearly shown in Fig. 3. Every other conveying member 10 is rigidly connected with a circular sleeve 12 mounted to slide upon the exterior of the tube 1, and the other conveying members are rigidly connected with a second sleeve 13 also mounted to slide upon the exterior of the tube 1. Therefore, three of the conveying members which are disposed 120° apart are rigidly connected with the first sleeve 12, preferably by means of the bolts 12ª (Fig. 5), and the other three conveying members 10 are rigidly connected with the second sleeve 13, preferably by means of similar bolts 13ª (Figs. 1 and 3). All of the conveying members 10, however, are of the same length and those which are connected with the first sleeve 12 extend rearwardly and are guided in the tube 1 by means of a button-like projection 15 on the conveying member which engages and slides in a slot 16 formed in the tube. Likewise those conveying members 10 which are secured at their rear end to the sleeve 13 have a similar button-like projection 17 (Fig. 3) on its forward part which engages and slides in a slot 18 in the forward part of the tube 1. In addition to the guiding slots 16 and 18, it will be understood that the tube is also provided with longitudinal slots or openings 19 through which the bolts 12ª may pass from the sleeve 12 to three of the conveying members 10, and is also provided with longitudinal slots 20 through which the bolts 13ª may pass from the sleeve 13 to the other three conveying members 10.

It is obvious that if the sleeves 12 and 13 be reciprocated in opposite directions upon the tube 1, the two groups of picker fingers will be reciprocated in opposite directions, as above described. This reciprocation of the sleeves may be effected by any suitable mechanism, as the detailed construction of the driving mechanism is immaterial to the present invention. Preferably, however, a rotary crank disk 21 is mounted upon the tube 1 by means of a bracket 22. This disk is connected by means of a small pitman 23 to the sleeve 12, and by a second pitman 24 to the sleeve 13. The pitman being connected to the disk and to the sleeves, in the manner indicated in Fig. 2, will obviously produce reciprocation of the sleeves 12 and 13 upon the tube 1 in opposite directions when the disk is rotated. Immediately behind the disk 21 and mounted to rotate therewith is a gear 25 which meshes with a driving pinion 26 which may be driven in any appropriate manner, such as by means of a flexible shaft driven from any suitable source of power.

The sleeves 12 and 13 may be guided and prevented from rotating upon the tube 1 by means of a plurality of radially projecting and longitudinally disposed ribs, those for the sleeve 12 being shown at 12′ and those for the sleeve 13 being shown at 13′. Each of these ribs is engaged along one side by means of an inwardly extending projection upon the sleeve. These projections on the sleeve 12 are shown at 12″ in Fig. 5, and similar inwardly extending projections are provided on the sleeve 13 for coöperation with the ribs 13′.

The mechanism for effecting the inward and outward movement of the picker fingers of each group as they are reciprocated is preferably constructed as follows. Each of the channel members 2′ and 2″ of each guide 2 is provided near the outer end of the guide with a substantially semi-circular bulge or portion of increased width, as shown at 27. In other words, the upper flange of each of these channel members is curved, so that it is substantially arch-shaped at this point. This is clearly illustrated in Figs. 3 and 7. Each of the picker fingers 4 is provided at its rear end with a pin 28 which projects laterally from each side of the finger, and this pin is normally urged toward the top flanges of the channel members 2′ and 2″ of each guide by means of a leaf-spring 29 secured to the carriage 5 and acting upon the corresponding picker finger 4. When the carriage and picker finger are removed from the picker head, this spring tends to tilt the picker finger to the position shown in Fig. 6, but when the picker finger and carriage are properly positioned in the picker head, the guide 2 in which the picker finger is mounted controls movement of the picker finger by the spring 29. Considering the action of one picker finger, it will be noted that as it is moved forwardly, it is held in substantially horizontal position, due to the fact that the pin 28 is prevented from moving up into the arch-shaped portion of the upper flange 2ª by riding under a pair of flat leaf springs 30 which produce, in effect, a continuation of the straight portions of the upper flanges 2ª. The springs 30, however, are of less length than the arches 27, and, therefore, when the ends of the springs 30 are reached, the spring 29 acting upon the picker finger 4 tilts the same in the manner shown in Fig. 6, until the extremities of the pin 28 move up into the arch-shaped portions 27 of the upper flanges 2ª. In Fig. 7, the pin 28 has just reached the extremity of the springs 30 and any further movement of the finger would cause the spring 29 to tilt the finger in the manner just described. The result of this action is to bring the brush 7 nearer to the axis of the tube 1. It will be understood that this action simultaneously takes place with three of the picker fingers located 120° apart so that as these three picker fingers reach their advanced position, they are simultaneously moved toward each other. When these three picker fingers are moved rearwardly, the pins 28 are guided by the arch-shaped portions 27 of the upper flanges 2ª. These three fingers move in their closed relation toward the rear end of the tube until the pins 28 are deflected downwardly by the rear part of each arch-shaped portion 27 of the upper flanges 2ª. As the pins 28 are thus deflected downwardly, the picker fingers are again shifted to their horizontal position. When the pins 28 in being thus deflected downwardly reach the springs 30, the latter open to permit passage of the pins by the springs. The springs 30, therefore, act as spring switches to retain the picker fingers in their horizontal position during their entire outward stroke, as the pins 28 ride upon the under surface of the springs until the extremities of the springs are reached. Upon the return movement of the fingers, however, the pins 28 move over the springs 30, but the latter open when the pins contact therewith to permit complete restoration of the picker fingers to their horizontal position, as will be readily understood from Figs. 3 and 7. In Fig. 3, the pin 28 of the uppermost brush is moving rearwardly along the arch-shaped portions 27 of the flanges 2ª and when the springs 30 are reached by the extremities of the pin, the extremity 30' of the spring will move downwardly to permit passage thereby of the pin 28. The opposite end of the spring 30'' is rigidly secured to the side walls of the guide members 2' and 2'' and cannot move. As the extremity 30' of the spring 30 cannot move upwardly, the pin 28 during its forward motion will ride under the springs 30 and the latter will retain the spring finger in the horizontal position until the extremities of the springs 30 are reached, at which time, the picker finger will move to the position assumed by the uppermost brush in Fig. 3.

It will, therefore, be seen that three of the brushes arranged 120° apart move forwardly in an open or separated condition, and when they reach the forward end of their stroke, they suddenly approach each other, as shown in Figs. 1, 2 and 3, and close in upon the cotton. They then start their rearward movement while in this closed position and when they near the end of their rearward movement, they are again restored to their normal separated or open condition. During this time, the other three fingers are operating in a similar manner, but are moving forwardly in an open or spread condition while the fingers of the first set are moving rearwardly in their closed condition. The cotton pulled into the outer end of the tube in this manner is gripped by the series of conveying members 10 which, on account of their reciprocating motion, convey the cotton through the tube 1 and discharge it into a bag or other receptacle which may be connected directly with the tube 1, or the cotton may be conveyed pneumatically to any suitable point of collection.

In practice, a cylindrical casing will inclose the operating parts upon the tube 1, but this casing has been omitted in the drawings to expose the underlying mechanism. The tube is intended to be held in the operator's hand who will direct the picker head toward the cotton which will immediately be gripped by the brushes and pulled from the cotton bolls and conveyed back through the tube and discharged from the rear end thereof.

It will now be noted that the movement of the picker fingers in reaching forward, closing upon the cotton and drawing the same into the tube, is analogous to the movement of the human fingers in picking cotton. I do not wish to limit myself to the specific construction shown and described for producing this movement, as various changes may be made in the details of construction without departing from the scope of the invention, as defined in the accompanying claims, and furthermore it will be obvious that any appropriate mechanism may be employed to effect reciprocation of the fingers, as the detailed construction of this part of the apparatus is wholly immaterial to the invention.

What I claim is:—

1. A cotton picker head comprising a tube, two sets of picker fingers associated therewith, means to reciprocate said sets of fingers in opposite directions, and means acting upon said fingers during their reciprocation to cause the outer ends of the fingers of each set to approach the axis of the tube at the outer end of their stroke and to recede from the axis of the tube near the inner end of their stroke.

2. A cotton picker head comprising a support, two sets of picker fingers associated therewith, means to reciprocate said sets of fingers in opposite directions, and means acting upon said fingers during their reciprocation to cause the outer ends of the fingers of each set to approach each other at the outer end of their stroke and to recede from each other near the inner end of their stroke.

3. A cotton picker head comprising a support, a plurality of sets of picker fingers associated therewith, means to reciprocate said sets of fingers so that they reach the outer end of their strokes at different times, and means acting upon said fingers during their reciprocation to cause the outer ends of the fingers of each set to approach each other at the outer end of their stroke and to recede from each other near the inner end of their stroke.

4. A cotton picker head comprising a support, a plurality of picker fingers reciprocably mounted on said support, means to reciprocate said fingers, and means comprising a spring switch to cause the outer ends of the fingers to approach each other at the outer end of their stroke and to recede from each other at the inner end of their stroke.

5. A cotton picker head comprising a tube, a plurality of guides associated therewith, a picker finger mounted to reciprocate in each guide, means to reciprocate said fingers, and means associated with each guide for causing the outer ends of the fingers to approach each other at the outer end of their stroke and to recede from each other near the inner end of their stroke.

6. A cotton picker head comprising a tube, a plurality of guides associated therewith, a picker finger mounted to reciprocate in each guide, means to reciprocate said fingers, and means including a spring switch associated with each guide for causing the outer ends of the fingers to approach each other at the outer end of their stroke and to recede from each other near the inner end of their stroke.

7. A cotton picker head comprising a support, a plurality of guides associated with said support, a picker finger reciprocably mounted in each of said guides, means to reciprocate said fingers, and means to cause the outer ends of the fingers to approach each other at the outer end of their stroke and to recede from each other at the inner end of their stroke, said means comprising a leaf-spring associated with each guide under which a portion of the corresponding finger passes during its movement in one direction and over and by which it passes during its movement in the other direction.

8. A cotton picker head comprising a hollow tube, a plurality of reciprocable fingers associated therewith, means to reciprocate said fingers, and reciprocating conveying members mounted in said tube to convey through the tube the cotton picked by said fingers.

9. A cotton picker head comprising a hollow tube, a plurality of reciprocable picker fingers associated therewith, means to reciprocate said fingers, conveying members mounted in said tube and reciprocable with said fingers to convey through the tube the cotton picked by said fingers.

10. A cotton picker head comprising a hollow tube, a plurality of reciprocable picker fingers associated therewith, means to reciprocate said fingers, and a conveying member connected to each of said fingers and reciprocable therewith to convey through the tube the cotton picked by said fingers.

In testimony whereof I affix my signature.

IRA E. McGEHEE.